(No Model.)
S. McCOLM.
SOIL PULVERIZER.
No. 532,689. Patented Jan. 15, 1895.
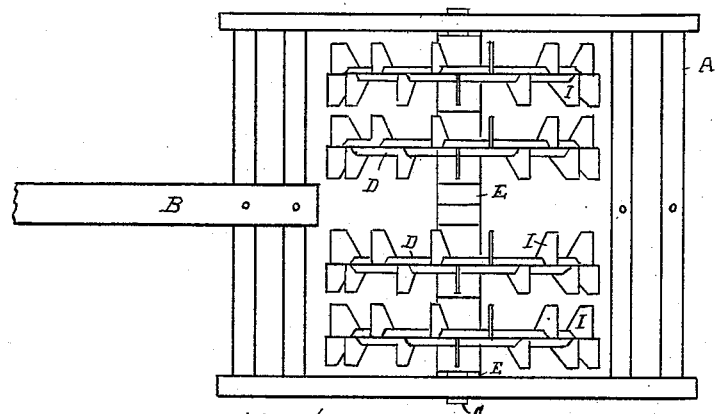
Fig. 1.
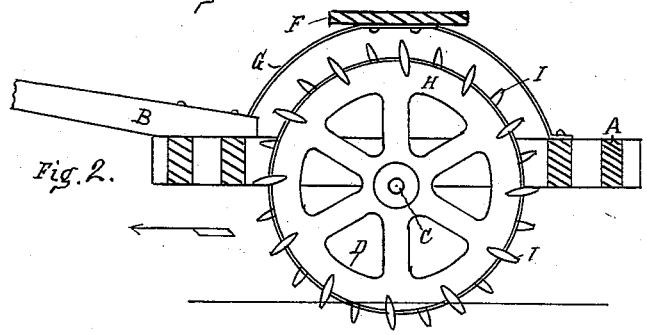
Fig. 2.
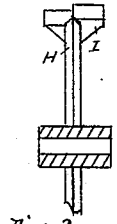
Fig. 3.
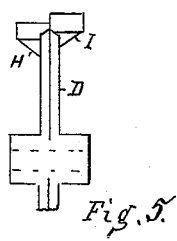
Fig. 5.
Fig. 4.
WITNESSES.
J. E. Hancock
Geo. E. Seidel
Stephen McColm. INVENTOR.
By Robert S. Carr Atty.

UNITED STATES PATENT OFFICE.

STEPHEN McCOLM, OF MANCHESTER, ASSIGNOR OF ONE-HALF TO THE H. P. DEUSCHER COMPANY, OF HAMILTON, OHIO.

SOIL-PULVERIZER.

SPECIFICATION forming part of Letters Patent No. 532,689, dated January 15, 1895.

Application filed August 24, 1894. Serial No. 521,212. (No model.)

*To all whom it may concern:*

Be it known that I, STEPHEN McCOLM, of Manchester, Adams county, Ohio, have invented certain new and useful Improvements in Soil-Pulverizers, of which the following is a specification.

My invention relates to that class of soil pulverizers that crush the clods or loosen the surface of the soil to better prepare it to receive the seed, and the objects of my improvement are, to make the machine reversible in its direction of movement, and to locate the lugs or spurs on the wheels in such inclined positions that they penetrate the soil deeper during the movement of the wheels in one direction than in the other. These objects are attained in the following described manner as illustrated in the accompanying drawings, in which—

Figure 1 is a plan of the machine; Fig. 2, a longitudinal vertical section thereof; Fig. 3, a transverse vertical section of a portion of the wheel shown in Fig. 2; Fig. 4, a side elevation of the wheel with the spurs or lugs in a different position thereon; Fig. 5, a transverse vertical section of a portion of the wheel shown in Fig. 4.

In the drawings A represents the frame of the machine formed alike at both ends; B, the pole that may be attached to either end thereof according to the direction it is desired to pull the machine. The axle C spans the middle portion of the frame and is journaled to rotate in bearings secured under the sides thereof. A series of metal pulverizing wheels D are mounted on the axle within the frame, and are free to turn thereon independently of each other.

Collars E of the desired length encircle the axle to form wider spaces between contiguous wheels thereon than exist when the hubs are in contact.

The driver's seat F is mounted on the frame by seat bows G in the usual manner. The length of the seat preferably equals the width of the frame.

The rim H of each of the pulverizing wheels is formed with a peripheral edge to penetrate the soil with less resistance. Series of wings or spurs I are formed integral with said rim and project perpendicular from each of its sides and at equal distances apart. The wings on one side of the rim are directly opposite to the spaces formed between the wings on the other side and in this manner they alternate from opposite sides of the rim successively. The inner ends of the wings terminate on a line with the annular edge that terminates the periphery of the rim and said wings are extended some distance beyond the periphery of the wheel similar to the teeth of spur gears which they resemble in being tapered to a dull edge parallel with the axis of the wheel. The thickest portion of the wings is on a line with the edge of the rim and parallel with the axis of the wheel whence the wings are tapered inwardly to a dull edge to form inwardly divergent spaces between them to prevent the clods from becoming wedged therein. The inner edge of the wings is preferably tapered from the side of the rim of the wheel to their point at their thickest portions.

The position of the wings on the sides of the rim of the wheel may be on a line with the radii of the wheel as shown in Fig. 4. It is preferable however to form the wings on the rim at an oblique angle to the radii of the wheel in such manner that their planes shall be inclined in the same direction to approximately bisect the angles formed by radii and tangents of the wheel intersecting at the outer edge of the respective wings (as shown in Fig. 2). In this inclined position of the wings they are permitted to penetrate the soil in a perpendicular direction as the wheels are moved in the direction of the arrow. They consequently enter the soil to a greater depth and pulverize it in a manner that resembles chopping or spading. By moving the wheels in a direction opposite to the direction of the arrow the sides of the wings are brought first in contact with the surface of the soil and tend to ride thereon rather than to enter it to any great depth. This action of the sides of the wings is preferable to crush the surface clods that exist when the soil is dry or arid.

It is thus evident that the machine is capable of performing different functions according to the direction in which the wheels are moved to obtain the greatest efficiency in either the arid or humid condition of the soil.

Instead of changing the pole to the opposite ends of the frame the pulverizing wheels may be reversed on the axle to change the direction of their movement. If desired to only partially modify the penetration of the wheels in the soil some of the wheels may be placed on the axle with the wings slanted in an opposite direction from the wings on the others.

Any plural number of wheels within the capacity of the axle may be placed thereon as desired, and they may be spaced different distances apart by means of collars of different lengths being used to encircle the axle between the hubs of contiguous wheels.

During the movement of the machine in a straight line the axle turns with the wheels and in the bearings, but the independent rotation of the wheels on the axle facilitates the turning of the machine to change its direction of movement.

Having fully described my improvement, what I claim as my invention, and desire to secure by Letters Patent, is—

1. A pulverizing wheel formed integral with a series of wings at equi-distant intervals on its rim, said wings being oblong in cross-section and projecting endwise from the sides of the rim alternately in opposite directions parallel with the axis of the wheel and projecting edgewise beyond the periphery of the wheel to the extent of about the one-third portion of their width.

2. A pulverizing wheel formed integral with a series of wings at equi-distant intervals on its rim, said wings being oblong in cross-section and projecting endwise from the sides of the rim alternately in opposite directions and projecting edgewise for a portion of their width beyond the periphery of the wheel and on opposite sides alternately of the extended middle plane of the wheel, the planes of the wings being inclined laterally to the same extent and in the same direction to the respective radii of the wheel.

3. A pulverizing wheel formed integral with a series of wings at equi-distant intervals on its rim, said wings being oblong in cross-section and projecting endwise from the sides of the rim alternately in opposite directions and perpendicular thereto, the planes of the wings being inclined laterally to the same extent and in the same direction to the respective radii of the wheel.

STEPHEN McCOLM.

Witnesses:
DAVID DUNBAR,
S. G. McGOVNEY.